Sept. 22, 1959
W. E. CLAXTON
2,904,994
PLASTIC TESTING DEVICE
Filed May 19, 1958
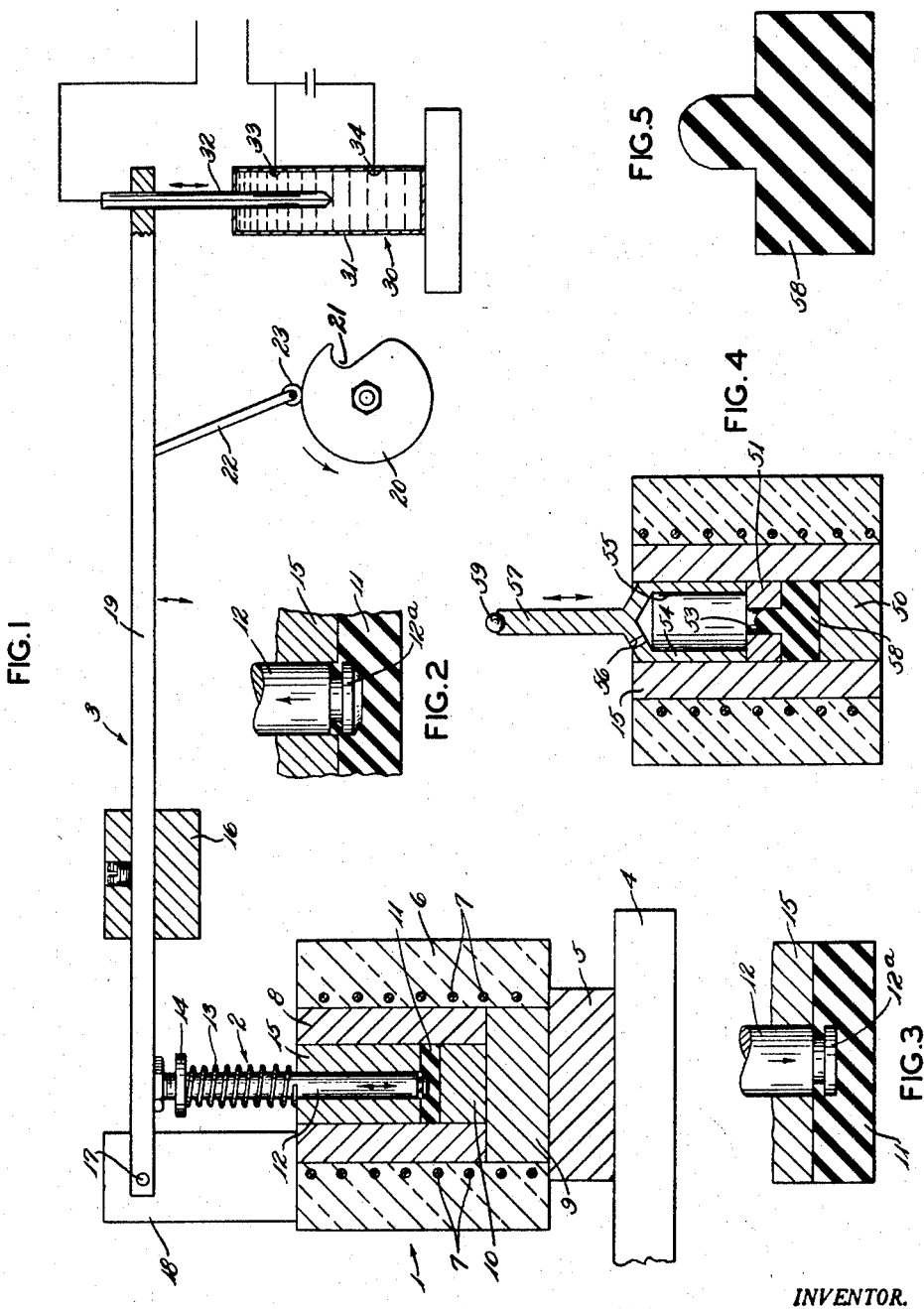
INVENTOR.
WILLIAM E. CLAXTON
BY
W. A. Fraser
ATTY.

United States Patent Office 2,904,994
Patented Sept. 22, 1959

2,904,994

PLASTIC TESTING DEVICE

William E. Claxton, Mogadore, Ohio, assignor to The Firestone Tire & Rubber Company, Akron, Ohio, a corporation of Ohio Application May 19, 1958, Serial No. 736,358

7 Claims. (Cl. 73—15.6)

The present invention relates to means responsive to changes in the physical condition of rubbery and plastic materials, and more particularly to means for sensing physical properties changes in rubbery polymeric materials subjected to heat.

For example, such materials as natural and synthetic rubber undergo changes when subjected to heat, particularly when those materials have been mixed with vulcanizing agents such as sulphur. Those working in the art often desire to know the state of vulcanization or the plasticity condition in a rubber sample periodically during that treatment and to record changes in plasticity of rubbery materials while they are being subjected to heat and pressure in the vulcanizing system.

Although many instruments have been devised for testing rubber and plastic samples after a certain treatment has been completed it has been difficult, if not impossible, to devise means for measuring the change in such materials as they are in the process of being treated.

The present invention overcomes the difficulties of the prior art by providing means for measuring changes in physical properties of rubber and plastic samples in timed relation to the change in those properties during the treatment of the sample.

It is, therefore, an object of the invention to provide means for measuring changes in the physical properties of rubber and plastic materials as those materials are subject to change in physical properties. A further object of the invention is to provide a device which will measure changes in physical properties of a sample of rubbery material periodically during the treatment of that material. Yet a further object of the invention is to provide an apparatus for measuring changes in plasticity of samples of rubbery material as those materials are heat-treated. Yet a further object of the invention is to provide means for measuring the plasticity characteristics of a sample of plastic material.

These and other objects of the invention are obtained through the action of a plunger periodically reciprocated in a sample being treated in a cylinder. The amplitude of deflection of the plunger in response to its contact with the sample is measured and translated into a report of relative plasticity.

The invention will be readily understood with reference to the specification, claims and drawings of which:

Fig. 1 is an elevation view, partially broken away in section and partially schematic of the apparatus of the invention.

Fig. 2 is a fragmentary enlarged view of the end of the plunger of the invention when it is at the height of its upward movement.

Fig. 3 is similar to Fig. 2 except the plunger is at the lowest point in its downward movement.

Fig. 4 is an elevation view broken away in section of a modification of the invention.

Fig. 5 is an enlarged section of the plastic sample of the modification of Figure 4.

Referring to Figure 1 a specimen of rubbery material such as compounded natural rubber is heated in an oven assembly generally indicated at 1, while a plunger assembly generally indicated at 2 reciprocates with its end in the sample. The plunger assembly is actuated by a timing unit generally indicated at 3.

Oven assembly 1 is comprised of base 4, supporting a block 5 on which rests jacket 6 of the oven body in which are embedded electric wire coils 7 for heating the oven through conventional electrical means not shown. A cylinder 8 enclosed by the furnace and resting on support block 9, encloses a second support block 10 upon which rests the sample of rubber specimen 11.

A plunger 12 having a lower hook portion 12–A is mounted for reciprocation in cylinder 15, and biased for reciprocal action against stop 14 by coil spring 13. The lower end of spring 13 abuts against the top surface of cylinder 15 while the upper end of plunger 12 is attached to a loading arm 19 mounting a movable weight 16 and pivoted at one end at 17 on support 18.

The timing of the reciprocation of plunger 12 is accomplished by assembly 3 which is comprised of cam 20 rotated by a 24 volt D.C. motor not shown. An arm 22 is mounted upon and depends from loading arm 19 and mounts on its lower end follower 23 which bears against the peripheral surface of cam 20.

The movement of loading arm 19 is recorded by an arrangement of electrical apparatus comprised of an electrolytic potentiometer, generally indicated at 30, comprised of the tank 31 containing dilute sulphuric acid or another electrolyte. A sealed glass electrode 32 is attached to the outboard end of loading arm 19 and adapted to reciprocate in electrolytic potentiometer 30 in response to deflection of that arm. Two output terminals 33 and 34 are mounted in the sides of the electrolytic potentiometer, and it will be seen that, as the electrode 32 moves in and out of the electrolyte, the potential drop across leads 33 and 34 changes. The change in potential drop can be reported in terms of relative plasticity values by a conventional stylus and moving chart as for example in a Brown recorder.

In operation of the invention a sample of rubbery material 11 is placed on support 10, and on top of this sample cylinder 15 is placed within cylinder 8. Plunger 12 is centered in cylinder 15 with one end of spring 13 bearing on the top surface of the cylinder and the other end abutting against stop 14. The sample 11 is preheated by the coils 7 of the electric oven by a circuit not shown and not part of the invention. Next the D.C. motor, not shown, rotates cam 20 in a counter-clockwise direction so that the follower 23, follows the peripheral surface of the cam, under the urging of loading arm 19 until it comes to recess 21. Thereupon the follower drops into the recess 21 in the cam, and the first sudden drop of the loading arm and weight 16 thrusts plunger 12 down into sample 11 to form therein a pocket which encloses the end of the plunger. The end of the plunger remains in the sample as arm 19 is raised and (Fig. 3) as follower 23 follows the surface of cam 20. The distance of travel of plunger 12 in response to arm 19 is proportional to the plasticity of the sample which is now clinging about its end. In the early stages of the heating process, when the sample is soft and only partially vulcanized, the plunger will tend to distend the sample easily with the result that loading arm 19 pivoted at 17 has a fast rate wide amplitude of deflection.

However, as the sample becomes stiff in response to continuing heat, the deflection of plunger 12 and arm 19 will become less. Deflection of loading arm 19 lowers electrode 32 into the electrolytic potentiometer nearer to lead 34, to change the potential of the output of the electrolytic potentiometer. As the cam 20 continues to rotate in a counter-clockwise direction, follower 23 rides up out of recess 21 to the surface of the cam, thereby lifting cam rider arm 22 and loading arm 19. This action lifts plunger 12 with the rubber sample clinging to its end (Fig. 2) and also lifts electrode 32 to the neutral position between the two output leads 33 and 34 of the electrolytic potentiometer 30. As the cam continues to rotate, the follower again drops into the recess, but by this time more heat has been put into sample 11, so that the plasticity has changed to some extent. If the sample 11 is a vulcanizable rubbery material containing sulfur and accelerator, continued application of heat will cause the sample to stiffen, and as the cam 20 rotates through a number of successive turns, the output of the electrolytic potentiometer will change in proportion to the change in modulus of the sample. Through standard electronic or electrical controls and recording instruments not shown, but well-known to those skilled in the art, the difference in output of the electrolytic potentiometer 30, in response to changes in modulus of the sample 11, is reflected.

*Example*

As a specific example of a test run with the apparatus a specimen of synthetic rubber tread stock was prepared in a conventional manner according to the following formula:

| | |
|---|---|
| Butadiene-styrene copolymer | 100.00 |
| Softener (added to polymer in latex stage) | 25.00 |
| Oil | 5.00 |
| Carbon black (HAF) | 60.00 |
| Zinc oxide | 3.00 |
| Stearic acid | 2.00 |
| Vultac #2 [1] | 4.80 |
| Antioxidant | 3.80 |
| Accelerator | 1.50 |
| | 205.10 |

[1] Alkyl phenol disulfide sold by Sharples Chemicals, Inc.

First the electric oven 3 was turned on to give a temperature of 280° F. The specimen then was placed in cylinder 8 on support 10 and cylinder 15 mounting a five pound weight 16 centered thereover.

Thereupon the motor was turned to rotate cam 20 at a speed of 1 revolution every 2½ minutes. Deflection of arm 19 was recorded through electrolytic potentiometer 30. Using as a base the value of the highest plasticity attained by the specimen, the percent of final plasticity was calculated at different times during the heat treatment of the sample. These percentages were compared with the percentage of plasticity attained by samples of the same material treated at the same temperature for the same length of time and tested on a Scott Tester according to ASTM test D412–51T revised 1951.

A comparison of relative plasticity obtained by the novel tester as compared to test by the Scott Tester was as follows:

| Cure time | Novel device relative modulus | Scott tester relative 300% modulus |
|---|---|---|
| 15 | .50 | .53 |
| 30 | .81 | .80 |
| 45 | .95 | .97 |
| 60 | 1.0 | 1.00 |

The above results show that treatment by the novel device attains plasticity figures comparable to conventional well accepted testing devices. The advantage of the novel device lies in the fact that the plasticity tests are run on the sample progressively during its treatment.

In a modification of the invention a special plunger (Figure 4) used in the apparatus permits viscosity measurements to be made on rubbery materials. In this modification of the invention cylinder 15 encloses a base support 50 supporting rubber specimen 58 topped by an orifice slug 51 having a center hole 53. A piston 54 rests on slug 53 and is provided with extrusion cavity 55 from which leads air bleeder channel 56. Plunger piston 54 is adapted for a reciprocating motion through plunger arm 57 terminating in ball 59.

In operation of this modification of the invention rubber specimen 58 was placed on support 50 and capped with orifice slug 51. Piston 54 is then lowered onto the orifice slug and the cam 20 rotated by the motor. As arm 19 drops, load is applied to the ball 59 to push bleeder arm 57 and piston 54 against slug 51. The slug is forced down against specimen 58 and that material is forced through the center hole of the slug into extrusion cavity 55. It will be seen that the flow of the specimen through the orifice slug into the extrusion cavity is proportional to the viscosity of the specimen. This viscosity property is translated by the potentiometer into changes in the flow of electrical energy through circuit. This flow activates a conventional recording device such as Brown Recorder.

In the first described modification of the invention used for obtaining relative plasticity values, the plunger 19, weight 16 and follower 23 are so arranged that the follower will not bottom in the recess in cam 20 but will nearly touch the bottom on the first cam cycle. Continuing operation of the device reverses the plasticity of the sample so that plunger 19 travels a shorter distance and follower 23 drops a shorter distance into the recess in cam 20 on each cycle of the cam.

Although the invention has been illustrated by specific example, modification may be made within the scope of the following claims.

What is claimed is:

1. Apparatus for measuring the physical characteristics of a rubbery sample periodically as said sample undergoes changes in physical properties comprising means defining a sample chamber having an opening, reciprocating means having one end protruding into the chamber during at least part of the reciprocating action and embedded in the sample at all positions of reciprocation, means to reciprocate said reciprocating means, and means responsive to said reciprocating means adapted to record the resistance of a sample in said chamber to the end of said reciprocating means.

2. Apparatus for periodically measuring the physical characteristics of a rubbery sample as said sample undergoes changes in physical properties comprising means defining a sample chamber having an opening, a plunger mounted for reciprocating action through said opening into the chamber and having one end embedded in the sample at all positions of reciprocation, means to reciprocate said plunger through said opening and means responsive to the amplitude of reciprocation of said plunger and adapted to record the resistance of said sample to said reciprocation.

3. Apparatus for periodically measuring the physical characteristics of a rubbery sample as said sample undergoes changes in physical properties comprising means defining a sample chamber having at least one opening, a plunger having one end protruding through said opening into the chamber embedded in the sample and mounted for reciprocating action therein, a support mounted adjacent said plunger, an arm pivoted on said support and attached to the end of said plunger opposite said protruding end, means to oscillate said arm about said pivot with respect to said pivot to thereby reciprocate said plunger through said opening, and measuring means responsive to the amplitude of reciprocation of said plunger for measuring the resistance of the sample thereto.

4. Apparatus for periodically measuring the physical characteristics of a rubbery sample as said sample undergoes changes in physical properties comprising means defining a sample chamber having at least one opening, a plunger having a hooked end protruding through said opening into the chamber and mounted for reciprocal action therein, a support mounted adjacent the chamber, an arm pivoted on said support and attached to the end of said plunger opposite the hooked end, means to oscillate said arm about said pivot to thereby reciprocate said plunger in said chamber and means responsive to the movement of said reciprocating plunger and adapted to record the movement of said plunger as an indication of the resistance to deformation of said sample.

5. Apparatus for periodically measuring the physical characteristics of a rubbery sample as said sample undergoes changes in physical properties comprising means defining a sample chamber having at least one opening, a plunger having a hooked end protruding through said opening into the chamber and mounted for reciprocal action therein, a support mounted adjacent said chamber, an arm pivoted on said support and attached to the end of said plunger opposite said hooked end, means to oscillate said arm about said pivot to thereby reciprocate said plunger in said chamber, and electrical means responsive to the movement of said reciprocating plunger and adapted to record the movement of said plunger as an indication of the resistance to deformation of said sample.

6. Apparatus for periodically measuring the physical characteristics of a rubbery sample as said sample undergoes changes in physical properties comprising means defining a sample chamber having at least one opening a plunger having a hooked end protruding through said opening into the chamber and mounted for reciprocal action therein, a support mounted adjacent said chamber, an arm pivoted on said support and attached to the end of said plunger opposite said hooked end, a cam follower depending from said arm, a cam adapted to periodically drop and lift said follower to thereby pivot said arm and reciprocate said plunger in said chamber, and electrical means responsive to the movement of said reciprocating plunger and adapted to record the movement of said plunger as an indication of the resistance to deformation of said sample.

7. An apparatus according to claim 6 including means to heat said sample to change its physical characteristics during the reciprocation of said plunger in said chamber.

References Cited in the file of this patent

UNITED STATES PATENTS

| | | |
|---|---|---|
| 1,988,597 | Karrer | Jan. 22, 1935 |
| 2,066,016 | Rossi | Dec. 29, 1936 |
| 2,283,743 | Lessig | May 19, 1942 |
| 2,376,814 | Robinson | May 22, 1945 |
| 2,760,370 | Linhorst | Aug. 28, 1956 |